J. V. PUGH.
TWIN RIM FOR WIRE SPOKED VEHICLE WHEELS.
APPLICATION FILED JUNE 14, 1915.
1,239,824.
Patented Sept. 11, 1917.
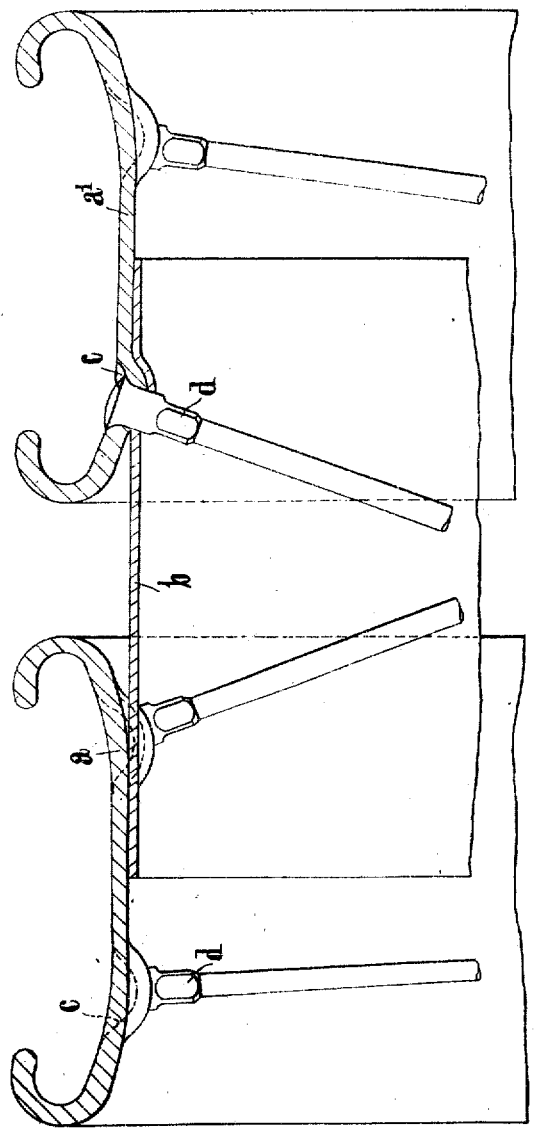
Inventor:
John Vernon Pugh,
by Spear Middleton Donaldson & Spear
Attorneys.

UNITED STATES PATENT OFFICE.

JOHN V. PUGH, OF ALLESLEY, ENGLAND, ASSIGNOR TO RUDGE WHITWORTH, LIMITED, OF COVENTRY, ENGLAND.

TWIN RIM FOR WIRE-SPOKED VEHICLE-WHEELS.

1,239,824.        Specification of Letters Patent.        Patented Sept. 11, 1917.

Application filed June 14, 1915. Serial No. 34,112.

*To all whom it may concern:*

Be it known that I, JOHN VERNON PUGH, a subject of the King of Great Britain and Ireland, and residing at Guiting House, Allesley, in the county of Warwick, England, have invented certain new and useful Improvements in and Relating to Twin Rims for Wire-Spoked Vehicle-Wheels, of which the following is a specification.

This invention relates to vehicle wheels provided with twin rims and it has for its object the provision of means for connecting together in a cheap and efficient manner for this purpose the ordinary types of rims used in the construction of wire spoked wheels.

The invention consists in a vehicle wheel having a twin rim formed of two rims of the wire spoked wheel type mounted upon a third member and retained firmly in connection therewith by the process of spoking the wheel.

The invention also consists in a hoop or band-like member upon which are mounted a plurality of rims of the wire spoked wheel type, said member and rims being firmly united by the method of fitting spokes which is adopted to form a wheel.

The invention also consists in a rim for a double-tired vehicle wheel, in which two rims of the wire spoked wheel type are mounted upon a hoop or band-like member and retained thereon by depressions formed in the double thickness of material resulting from the overlapping of said hoop and rims.

The invention further consists in a method of forming twin rim wheels for vehicles consisting in mounting two rims of the wire spoked wheel type upon a hoop or ring of sheet material, forming around the circumference in each double thickness of material occurring at the junction of the hoop and a rim, locating depressions for the spoke holes, and connecting the combined rims and hoop to a hub by spokes passing through said holes.

The invention also consists in an improved twin rim for a vehicle wheel as hereinafter described.

In carrying the invention into effect as shown by way of example in the accompanying drawing, two wheel rims $a$ and $a^1$ of the type ordinarily used in the construction of wire spoked wheels are mounted at a convenient distance apart upon a hoop or band $b$ which may be formed of a strip of sheet steel or other material with its ends joined in any suitable manner, or may be produced in any other convenient way.

The width of the hoop $b$ may be such that its edges coincide with the centers of the two rims $a$ and $a^1$ when the latter are at the desired distance apart, the diameter being such that the hoop accurately fits the inside of the rims all around the circumference. The thickness as shown in the drawing may be somewhat less than that of the rims but this may be varied as desired according to the material and construction of the hoop.

The hoop and rims may be temporarily held together in the desired positions by any suitable means while locating depressions $c$ and holes for the spoke nipples $d$ are formed around the circumference. The depressions and holes may be conveniently formed in the way described in the British Patent 12,273 of 1908, at least one row of the depressions and holes on each side of the wheel being situated in the double thickness of material resulting from the overlapping of the hoop and rims.

The depressions formed in the double thickness of material form an efficient means for holding the two rims firmly upon the connecting hoop or band, and the spoke nipples act as an additional attachment when the wheel is built up.

The manner of carrying the invention into effect may be varied without in any way departing from the spirit of the same.

Having now described my invention, what I claim as new and desire to secure by Letters Patent is:—

1. A vehicle wheel having a twin rim formed of two rims of the wire spoked wheel type mounted upon a third member and retained firmly in connection therewith by a series of distortions formed in the overlapping portions of rims and member.

2. A hoop or band-like member upon which are mounted a plurality of complete rims of the wire spoked wheel type, said member and rims being firmly united by interengaging projections and depressions formed in the overlapping portions.

3. A rim for a double tired vehicle wheel in which two rims of the wire spoked wheel type are mounted upon a hoop of band-like form and retained thereon by depressions formed in the double thickness of material resulting from the overlapping of said hoop and rims.

4. A twin rim wheel for a vehicle comprising two rims of the wire spoked wheel type mounted upon a hoop of sheet material, said members having locating depressions for spoke holes formed around the circumference in each double thickness of material occurring at the junction of the hoop and a rim, and the combined rims and hoop being connected to a hub by spokes passing through said holes, substantially as described.

5. A twin rim wheel for a vehicle having in combination a wide hoop of thin material, a rim for carrying a tire mounted upon and overlapping each side thereof, a series of depressions formed around the circumference in each overlapping zone, spokes passing through holes formed in said depressions to support said rims and hoop in their operative position in a wheel, and headed nipples screwed upon said spokes and having their heads housed in said depressions.

In testimony whereof, I have affixed my signature.

JOHN V. PUGH.